US012472625B2

United States Patent
Mellander et al.

(10) Patent No.: US 12,472,625 B2
(45) Date of Patent: Nov. 18, 2025

(54) POLICY-RESTRICTED EXECUTION OF A ROBOT PROGRAM WITH MOVEMENT INSTRUCTIONS

(71) Applicant: ABB Schweiz AG, Baden (CH)

(72) Inventors: Roger Mellander, Västerås (SE); Roger Dahlgren, Västerås (SE)

(73) Assignee: ABB Schweiz AG, Baden (CH)

( * ) Notice: Subject to any disclaimer, the term of this patent is extended or adjusted under 35 U.S.C. 154(b) by 161 days.

(21) Appl. No.: 17/998,297

(22) PCT Filed: May 12, 2021

(86) PCT No.: PCT/EP2021/062735
§ 371 (c)(1),
(2) Date: Nov. 9, 2022

(87) PCT Pub. No.: WO2021/229004
PCT Pub. Date: Nov. 18, 2021

(65) Prior Publication Data
US 2023/0211501 A1    Jul. 6, 2023

(30) Foreign Application Priority Data
May 13, 2020 (WO) ................ PCT/EP2020/063335

(51) Int. Cl.
*B25J 9/00* (2006.01)
*B25J 9/16* (2006.01)

(52) U.S. Cl.
CPC .......... *B25J 9/1664* (2013.01); *B25J 9/1671* (2013.01); *B25J 9/1674* (2013.01)

(58) Field of Classification Search
None
See application file for complete search history.

(56) References Cited

U.S. PATENT DOCUMENTS 5,051,676 A * 9/1991 Seki .................. B25J 9/1671
901/17
6,445,964 B1 * 9/2002 White .................. B25J 9/1689
706/920

(Continued)

FOREIGN PATENT DOCUMENTS

| KR | 1020170136406 A | 12/2017 |
| WO | 2017050895 A1 | 3/2017 |
| WO | 2017220128 A1 | 12/2017 |
| WO | 2019077600 A1 | 4/2019 |

OTHER PUBLICATIONS

Chinese Office Action and Search Report; Application No. 202180033980.3; Completed: Sep. 9, 2024; 4 Pages.

(Continued)

*Primary Examiner* — Truc M Do
(74) *Attorney, Agent, or Firm* — Whitmyer IP Group LLC (57) ABSTRACT

A method of controlling a robot manipulator on the basis of a program containing a plurality of movement instructions. In the method, identification information related to a robot installation is obtained, and it is determined, on the basis of the identification information, whether any of the movement instructions relates to a location of the robot manipulator which is non-verified with respect to the robot installation, wherein a location is a pose, a path and/or a modulated path. If this is true, the method applies a policy which restricts execution of the program.

20 Claims, 2 Drawing Sheets

(56) References Cited

U.S. PATENT DOCUMENTS

| | | | |
|---|---|---|---|
| 2008/0114492 A1* | 5/2008 | Miegel | B25J 9/1664 |
| | | | 901/6 |
| 2013/0218334 A1 | 8/2013 | Hollmann | |
| 2015/0190926 A1 | 7/2015 | Miegel et al. | |
| 2015/0217449 A1* | 8/2015 | Meier | G05D 1/0088 |
| | | | 901/1 |
| 2015/0266183 A1* | 9/2015 | Alifragkis | B25J 9/1692 |
| | | | 700/254 |
| 2016/0207198 A1 | 7/2016 | Willför et al. | |
| 2018/0215040 A1 | 8/2018 | Asahara et al. | |
| 2019/0381664 A1* | 12/2019 | Whitman | B25J 9/1694 |
| 2020/0338721 A1* | 10/2020 | Okumura | G05B 19/4083 |

OTHER PUBLICATIONS

Hasegawa, Tsutomu, et al.; "Free Space Structurization of Telerobotic Environment for On-line Transition to Autonomous Tele-Manipulation"; ICAR '05 Proceedings, 12th International Conference on Advanced Robotics; IEEE; Seattle, WA, USA; Jul. 18, 2005; 7 Pages.

International Search Report and Written Opinion of the International Searching Authority; Application No. PCT/EP2021/062735; Completed: Aug. 2, 2021; Mailing Date: Aug. 16, 2021; 17 Pages.

Bibliographic Information for "RobotExpert—Collision Detection & Analysis"; Siemens Software; https://www.youtube.com/watch?v=3h7dkvulCdE; Publication Date: Sep. 6, 2015; 2 Pages.

* cited by examiner

POLICY-RESTRICTED EXECUTION OF A ROBOT PROGRAM WITH MOVEMENT INSTRUCTIONS

TECHNICAL FIELD

The present disclosure relates to the field of industrial robotics and in particular to a robot controller configured to apply a policy restricting execution of a robot program to the extent it contains movement instructions relating to non-verified locations of a robot manipulator.

BACKGROUND

In addition to aging and wear, industrial robots are exposed to the risk of sudden damage during operation. The structural and driving parts of the robot manipulator, as well as its tool or workpiece, may be damaged as a result of inaccurate positioning and orientation, poor gripping, unfavorable tribological conditions, and even collisions. Such damage may be tied to factors of a random nature—including tolerances, backlash and other deviations due to the gradual wear of the robot—but also deterministic ones, such as programming errors. Programmers, also experienced professionals, may find it difficult to fully grasp complex or changing work environments. Further, even with a correct appreciation of the task to be implemented, good programming practice may include avoidance of excessive safety margins that would detract from the robot's efficiency and performance.

The applicant's earlier application US20150190926A1 discloses a system for off-line programming of multiple interacting robots. The system can be used to verify one or more robot paths in a computer simulation that executes a robot program. A routine in the system simulates the at least one robot path for verifying the robot program code. This verification can be used to evaluate different positions of certain virtual objects and to detect possible collisions and other modeled anomalies between moving objects. Further, a user of the system can evaluate whether a robot as modeled is capable of reaching all targets (part positions) necessary for a part processing task. The evaluation may follow an inverse-kinematics approach, wherein the user's motion plan is transformed into joint actuator trajectories for the robot.

XP010835360 (Hasegawa et al.) and the applicant's earlier WO2017220128A1 are concerned with the problem of representing the free space of a robot manipulator.

Experience shows that even robot program code that has been validated through simulations may cause damage during execution. In particular, the idealized virtual environment of the simulation may fail to predict all details of the physical reality in which the robot operates.

SUMMARY

One objective is to make available a method for controlling a robot manipulator which reduces the risk of executing potentially harmful movement instructions. A particular objective is to identify whether a robot program contains potentially harmful movement instructions and, if so, apply a policy which restricts the executability of the program. It is a further objective to propose such a method that is not restricted to a particular robot installation. Another objective is to make devices and computer programs with a corresponding effect available.

These and other objectives are achieved by the invention as defined by the independent claims. The dependent claims define advantageous embodiments.

According to a first aspect, the invention provides a method for controlling a robot manipulator on the basis of a program containing, among others, a plurality of movement instructions. The method includes obtaining identification information related to a robot installation, determining whether any of the movement instructions relates to a location of the robot manipulator which is non-verified with respect to the robot installation, and, if this is the case, applying a policy by which execution of the program is restricted.

As used herein, a "location" of the robot manipulator may refer to a point, a pose (orientation), a path and/or a modulated path. The location may be expressed in any reference frame, including fixed reference frames and frames moving with a part of the robot or robot manipulator. A pose (orientation) of the robot manipulator may be represented as coordinates in joint space. The joint space coordinates express translational and/or angular displacements of each joint of a robotic link. A path may be understood as a curve passing through two or more stipulated points, which is optionally subject to a requirement for short total duration, short total length, low mechanical wear, limited momentary speed, limited curvature, or the like. A modulated path may fulfil a further requirement, such as a desired shape of the path or an activity to be performed during movement along the path, including oscillatory motion, use or inhibition of a tool, gripping of a load, etc. The path may be obtained an optimization on the basis of inputs stipulated by the movement instruction.

In the present disclosure, a movement instruction (or motion instruction) is said to "relate to" a location if it refers implicitly or explicitly to the location. As an example, a movement instruction, which requests movement of the robot manipulator along a path connecting two endpoints, refers implicitly to the path by stating the endpoints. Here, the path which the movement instruction causes the robot manipulator to perform may be a path generated according to default settings of the robot, a straight line, a curve, or a path fulfilling some constraint or optimality condition specified in the movement instruction. As another example, a movement instruction requesting the robot manipulator to move from a not-specified current point in space to a specified target point in space implicitly refers to a path (e.g., a path generated according to the default settings) starting in the current point and ending in the target point. Similarly, a motion instruction, which requests the robot manipulator to change its position or pose incrementally by a stipulated amount of relative translation and/or relative rotation, refers implicitly to its current position and pose, to the position and pose resulting after the stipulated amount of translation and/or rotation, and, if applicable, to the path connecting these.

This first aspect of the invention may bring the technical benefit that a program, which is found to contain movement instructions relating to a location that has not yet passed a verification test or has failed the verification test for the robot installation at hand, is restricted from being executed as a consequence of a policy being applied or enforced. The fact that the policy restricts the execution, at least initially, may enable an operator to take safety measures before executing the program. Furthermore, the application of the policy may alert a programmer to review and possibly improve a new, not yet executed robot program and/or an existing program which is to be executed by a different robot, reconfigured robot or reinstalled robot. Over the lifetime of the robot, such policy may preserve compliance with quality-, safety- or compatibility-related norms and/or ensure that the robot remains in sufficient technical condition to still pass an acceptance test specified by the end user. As yet another use case, the policy may be designed to protect leased robot equipment from damage inflicted by executing harmful program code.

In an embodiment of the method, a location is held to be non-verified unless it can be matched against a collection of verified locations. In particular, the location is held to be non-verified unless it can be matched against a collection of locations verified for the robot installation to which the identification information refers. In one implementation of this embodiment, the collection of verified locations is searched for a location to which a movement instruction relates; and if the search is unsuccessful, it is concluded that the location is non-verified. The present embodiment allows more efficient treatment of multiple instances of a location in a program; in particular, a verified or non-verified status resulting from a substantive analysis of a first encountered instance may carry over to the subsequent instances of the same location without a need to repeat the substantive analysis.

In different embodiments, the collection of verified locations may be obtained from an external source or may have been accumulated during earlier operation of the robot manipulator which is to execute the program. Under the second option, the method may comprise an earlier step of verifying a location by means of monitored execution, using a robot installation, of a movement instruction relating to the location. The collection of verified locations can be used at least for robot installations identical or equivalent to the robot installation used in the monitored execution. The movement instruction may optionally belong to the program that is to be executed, though this is not necessary.

As a simple example, the movement instruction nominally causes the robot manipulator to move to a point x and stay in this position, optionally with a specified pose (orientation) $\theta$. The monitored execution may include executing this instruction and measure the actual position of the robot manipulator; the actual position may differ as a result of wear, mounting inaccuracies, unexpected loading, etc. If however the actual position is found to agree with the nominal value up to an applicable tolerance, point x is deemed to be verified, optionally together with the pose $\theta$. If a collection of verified locations is maintained, point x and optionally the pose $\theta$ may be added to the collection. As another example, the execution of the movement instruction may be monitored with respect to the robot manipulator's interaction with surrounding objects, such as a workpiece with inaccurate dimensions, physical obstacles not accounted for, etc.

In a further simple example, the movement instruction nominally causes the robot manipulator to assume a specified pose $\theta$ and stay in this position. The monitored execution may include executing this instruction for a specific robot installation while measuring the actual pose of the robot manipulator and/or ascertaining whether the robot manipulator is not touching or colliding with a surrounding object. If however the actual pose is found to agree with the nominal value up to an applicable tolerance and freedom from collision can be confirmed, the location correspond to pose $\theta$ is deemed to be verified. If a collection of verified locations for this robot installation is maintained, said pose $\theta$ may be added to the collection.

Accordingly, the collection will consist of one or more verified points x or verified poses $\theta$ which have been added one by one. This means that, in normal circumstances, the collection will be a finite set of discrete elements.

The process of verifying locations according to the embodiments outlined above may be restricted to locations that have been pre-qualified by a preceding process of validation. The validation process may include a computer-aided simulation process, in which a movement instruction relating to the location to be validated is performed in a virtual environment including the robot manipulator. In one example, the simulation accepts closed (absolute) or incremental (relative) movement instructions as input and returns robot part positions which are computed by a forward-kinematics approach and using a model that incorporates the dimensions, masses and/or drive power of the parts of the robot, its manipulator, tools, loads etc. The simulation may include computing paths between points, to which the movement instructions refer; in particular, it may include computing modulated paths in the sense described above. The simulation may moreover be configured to compute all points visited by a reference point on the robot manipulator (or all regions of space visited by any part of the robot manipulator) during execution of a sequence of incremental movement instructions, wherein the sequence begins when the robot manipulator is in a known starting position and which is optionally subjected to an upper and/or a lower speed limitation. The simulation results may be inspected by a human user or may be analyzed automatically or semi-automatically by a computer-implemented routine to discover any collision, near-collision, surpassing of kinematic or dynamic limitations, episodes of excessively wear-inducing or unsafe behavior, or other anomalies. If this is found not to be the case, the location is deemed to be validated.

In an embodiment, the collection of verified locations is stored independently of the program. For instance, the collection may be stored as a data file, database or other data structure distinct or separate from the program containing the movement instructions. This embodiment is particularly advantageous for use with a robot that alternates between different tasks, implemented by different programs P1, P2, P3. In this case, the verified or non-verified status of a location can be used for all the different programs. For example, the collection of verified locations may have been formed by monitored execution of one of the programs P1, from which at least some of the locations reappear in the other programs P2, P3. This embodiment is also advantageous if the installation of the robot changes, with the consequence that the verification of the locations must be repeated. In a setup where the collection of verified locations is maintained independently of the programs, it is enough to modify the collection to reflect the change in robot installation, which will lead to a different outcome when the determination of whether any of the movement instructions relates to a non-verified location is rerun.

In one embodiment, the collection of verified locations is made available for use by another entity, such as a robot controller, robot programming station, or portable general-purpose computer. For example, a collection prepared by a first robot controller, which is associated with a specific robot or robot manipulator, can be shared with a second robot controller associated with the same robot or robot manipulator. Such reuse reduces the effort spent on verification of locations. If the collection is deemed to be applicable to further robots or robot manipulators, it may be shared with a larger circle of such entities.

In one embodiment, the collection of verified locations is associated with an identified robot installation. One approach may be to examine a robot program with respect to a collection of verified locations associated with the robot installation on which the robot program is to be executed. This may limit the risk that a collection of verified locations is used to examine a robot program in view of a different robot installation than the one on which the robot program is intended to be executed. As used herein, two "robot installations" may differ with respect to one or more of the following properties: an identity of the robot, a point of attachment, a load mass, a reference frame, a date of latest calibration, a provisioning date of a robot part, of the robot manipulator or of robot software. A change in any of these properties may alter the behavior of the robot to such extent that a verified location is no longer to be trusted; instead, the location may need to be re-verified. For example, the free space of a robot installed at a first point of attachment may be differ considerably from the free space of an identical robot that is installed at a second point of attachment, where it is surrounded by different objects. The robot installation may be identified by an arbitrary alphanumerical identifier or by technical information reflecting one or more of the properties mentioned.

In one embodiment, the method includes displaying a visualization of any non-verified locations. The visualization may be displayed to a user who acts, for example, as a robot programmer, a robot integrator, or an operator of the robot. Alternatively, the visualization may show each movement instruction that relates to at least one non-verified location. The visualization may highlight the movement instructions that relate to non-verified locations; or may highlight all movement instructions but those which relate to non-verified locations; or may define a plurality of appearances corresponding one or more of the following states of a location: verified, non-verified, validated, user-overridden. The different appearances may correspond to different colors, fonts, flags, frames or other graphical symbols. In a further development of this embodiment, where the non-verified locations are found by attempting to match the locations in the program against a collection of verified collections, the visualization is updated when the collection changes or is replaced; such change or replacement may be a result of modification of the robot installation in the above sense. The visualization may be updated as soon as the change or replacement becomes known, or the updating may be postponed until the next time a user requests the visualization to be displayed.

In one embodiment, the determination whether any of the movement instructions in the program relates to a non-verified location of the robot manipulator may be indirect. Such indirect determination may include computing a fingerprint of the program. As used herein, a "fingerprint" is an image of the program under a mapping with a high sensitivity to small changes. The image is preferably of a manageable size, such as not more than some tens or hundreds of characters, i.e., typically several orders of magnitude smaller than the program. A "fingerprint" in this sense may be referred to as a checksum, digest or hash. The mapping may be configured to disregard code which a compiler or interpreter or execution environment ignores and/or user-oriented comments, labels and names of variables and other objects.

After the fingerprint of the program has been computed, it is matched against a set of fingerprints of other programs, for which a direct determination has already been completed as to whether any of the movement instructions in each of the other programs relates to a non-verified location of the robot manipulator. The fingerprint of one of these other programs may have been included in the set of fingerprints if it has been established that the incidence of movement instructions relating to non-verified locations satisfies a predefined threshold. The threshold may represent a maximum permitted incidence, such as a number or percentage which has been selected in view of factors such that the intended task, working environment, quality grading and security class of the robot. An example percentage may be a one-digit number, such as a low one-digit number, or even zero. The set of fingerprints of already examined programs may be associated with a specific robot installation since, as explained above in connection with the collection of verified locations, a change in robot installation may render it necessary to re-verify at least some of the locations.

If the computed fingerprint of the program is found in the set of fingerprints of already examined programs, there is no need to perform a further determination whether any of the movement instructions relates to a non-verified location of the robot manipulator. Conversely, if the computed fingerprint is not found, the locations to which the movement instructions of the program relate are to be considered uncertain, and a search for non-verified locations must be launched. For example, the search for non-verified locations may include matching each location to a collection of verified locations.

As used herein, at least concerning the present embodiment, a "program" may be complete in the sense that it can be executed on a robot controller on which operating system, standard libraries etc. are available. A "program" may also be complete in the sense that it causes a robot manipulator to perform an industrial task or a well-defined sub-task thereof. In the context of fingerprint-based indirect determination whether any of the movement instructions in the program relates to a non-verified location of the robot manipulator, the term "program" may as well refer to a section of a complete program, such as a module, routine, template, class definition in object-oriented programming, or code snippets that may be expected to be reused by programmers or reappear for other reasons. For example, it is possible to define a decomposition rule by which a program is decomposed into independently analyzable sections, each being treated as a "program". Under this decomposition rule, which is used both for building the set of fingerprints and for examining specific program code to be executed, an analyzable section may begin with any movement instruction which specifies the location of the robot manipulator unambiguously; an analyzable section normally cannot begin with an incremental or relative movement instruction, since the resulting location depends on the starting position of the robot manipulator when the movement instruction is executed. The decomposition rule may require that the analyzable section shall be minimal in the sense that it does not extend beyond the starting point of the next possible analyzable section; such minimality tends to shorten the analyzable sections and thus to increase the likelihood that a fingerprint can be matched. Once analyzable sections have been produced by application of the decomposition rule, the locations to which their movement instructions relate can undergo a direct or indirect determination whether the incidence of movement instructions relating to non-verified locations is acceptable. It is recalled that direct determination may rely on matching against a collection of verified locations or on monitored execution, and indirect determination may be fingerprint-based.

According to a second aspect, there is provided a processor comprising memory and processing circuitry configured to perform the steps of the method according to the first aspect. The processor may constitute or be part of a robot controller configured to control a robot or robot manipulator. Alternatively, in distributed implementations, one or more networked processors, such as processing resources in an edge server or a cloud structure, may constitute the processor.

According to a third aspect, there is provided a computer program comprising instructions to cause a programmable processor to execute the steps of the method according to the first aspect.

In one embodiment, there is provided a data carrier which stores or carries this computer program. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of the magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings. On these.

DETAILED DESCRIPTION

The aspects of the present disclosure will now be described more fully with reference to the accompanying drawings, in which certain embodiments of the invention are shown. These aspects may, however, be embodied in many different forms and should not be construed as limiting. Rather, the embodiments are provided by way of example so that this disclosure will be thorough and complete, and to fully convey the scope of all aspects of invention to those skilled in the art.

Figure 1:
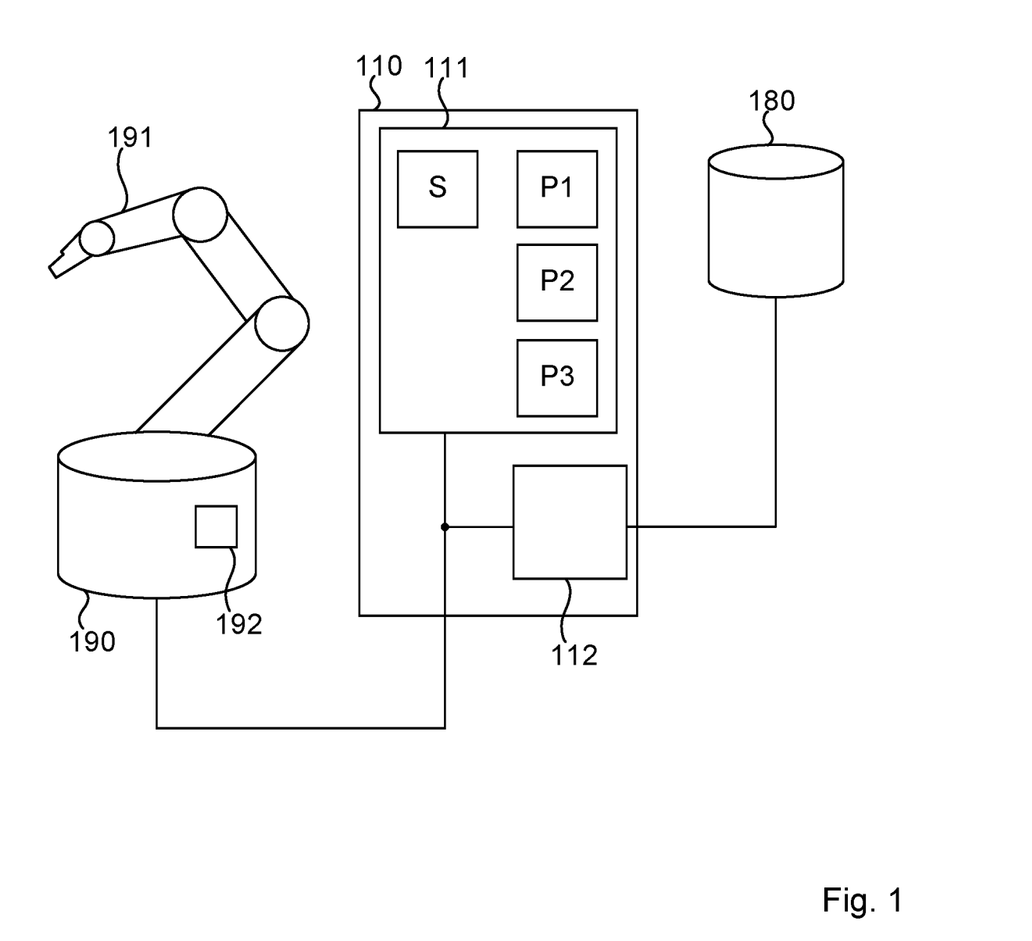
FIG. 1 shows an industrial robot system.

FIG. 1 shows an industrial robot system including a robot controller 110, an external memory 180 connected to the robot controller 110 and a robot manipulator 190 which exchanges control signals, sensor data etc. with the robot controller 110. The robot controller 110 comprises processing circuitry 112 and a memory 111. Example content of the memory 111 during operation is illustrated in FIG. 1. Such content may include S: any of an operating system, basic settings, software implementing generic movements, sensing, self-monitoring, generically useful functionalities and services (all typically contributed by an original manufacturer), task- or role-specific configurations, configuration templates (typically contributed by a robot system integrator), and site-specific settings (typically contributed by an end user);

P1, P2, P3: robot programs or projects causing the robot manipulator 190 to perform useful or intended tasks in its working environment.

Processes that execute programs P1, P2, P3 may do so in accordance with the memory content S, e.g., by making calls to available functionalities, libraries, routines or parameter values therein. It is recalled that the memory 111 and processing circuitry 112 of the robot controller 110 may be distributed and/or contain networked resources having a different physical localization than FIG. 1 shows.

The programs P1, P2, P3 may be created by a programmer with the aid of a robot programming station or a general-purpose computer, or directly at the robot controller 110 if a user interface is provided. In the first two cases, versions of the programs P1, P2, P3 may be downloaded to the robot controller 110 over a wired or wireless connection or by being temporarily stored on a portable memory. For example, if the external memory 180 is included in a programming station, the robot controller 110 may receive data from it via the illustrated connection line. As explained above, each program may contain a plurality of movement instructions relating to locations such as points, poses, paths and modulated paths. A movement instruction relating to a modulated path may be expressed as, or may include, a process-on-path instruction.

The robot manipulator 190 for its part includes an arm 191 including structural elements and at least one linear or rotary joint. It may further carry tools that allow it to interact with a workpiece. The manipulator 190 is movable by action of internal motors, drives or actuators (not shown) and includes transducers, sensors and other measuring equipment (not shown), from which the manipulator's 190 current position, pose, technical condition, load etc. can be derived, to some degree of accuracy. The position, pose etc. of the robot manipulator 19o may in particular refer to the arm 191.

Figure 2:
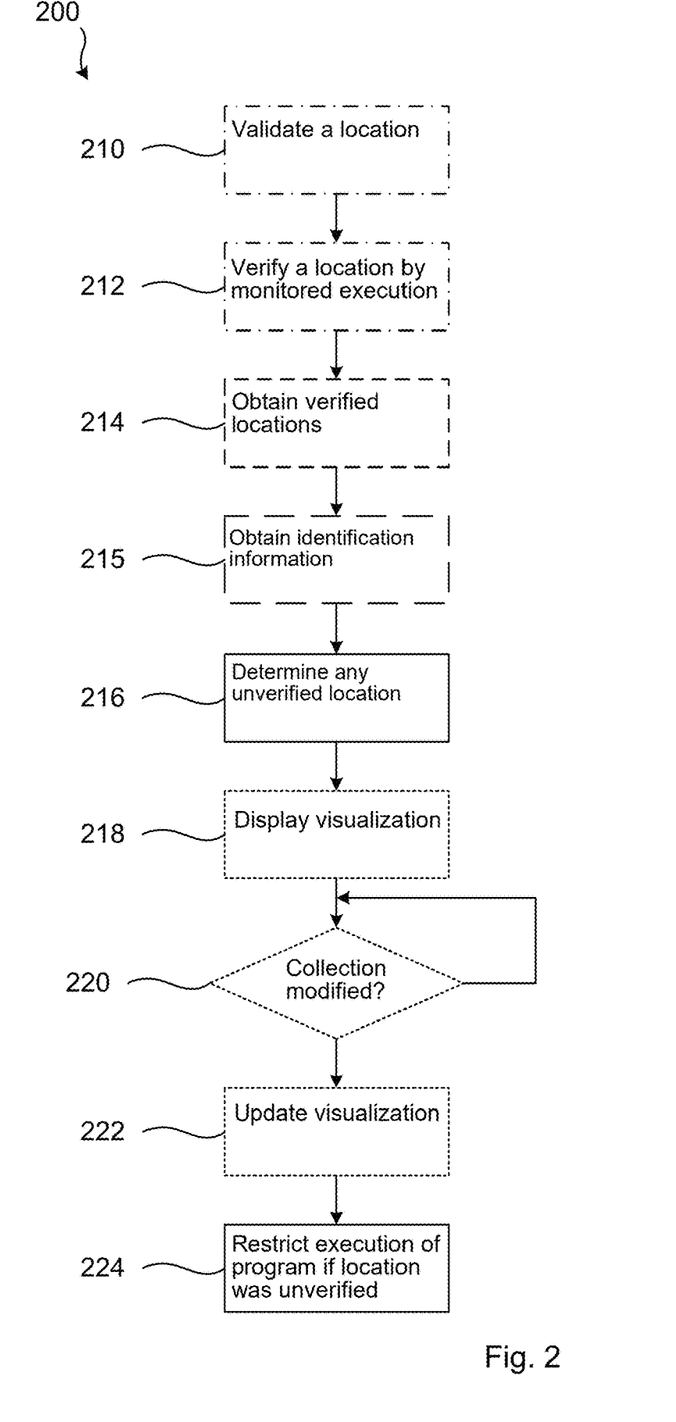
FIG. 2 is a flowchart, in which the steps of a method of a main embodiment are represented as solid-line boxes and groups of optional steps belonging to three further embodiments are drawn in dashed, dotted and dash-dotted line, respectively.

The method 200 shown in FIG. 2 may be implemented by the robot controller 110 or by a processor in another device. The processor may comprise at least a memory and processing circuitry like the robot controller 110 does.

In a first embodiment, the method 200 comprises the steps of determining 216 whether any of the movement instructions relates to a non-verified location of the robot manipulator 190, and applying 224, in response to a positive determination, a policy which restricts execution of the program. The further steps represented with non-solid line in the flowchart are optional and not included in this embodiment.

The precise nature of the policy, including the rules it embodies, is not essential to the present invention. As one example, a policy may block execution of a program if the percentage of non-verified locations exceeds a threshold value. To calculate the percentage, each location may be counted only the first time it occurs (percentage of unique locations), or all occurrences of the location may be counted (total percentage). The policy if applied may block execution of the program categorically. Alternatively, the policy may allow the program to execute until the first movement instruction relating to a non-verified location is encountered; at this point, execution may halt, and optionally the robot manipulator 190 is returned to a neutral position or an operator is asked to approve an override of the blocking which brought the execution to a halt.

As an alternative or additional feature, the policy may allow a program to execute if a sufficient share of the movement instruction relating to non-verified locations, as encountered during the determining step 216, have been overridden (i.e., marked in the sense that the policy's restriction on execution is permissible to override) by a user. Such overriding may express that the user has reviewed the movement instruction in question and satisfied himself or herself that it is of minor importance and therefore acceptable in the circumstances. A policy including an override feature may then be configured to block execution of a program (only) if the percentage of locations that are neither verified nor overridden exceeds a threshold value.

Runtime supervision may not be the primary aim of the present embodiment. Rather, the method 200 according to this embodiment may be performed offline, such as prior to a first attempt to initiate execution of a program, or before the program is downloaded to the robot controller 110. For convenience of operation, especially if the robot controller 110 includes other safety or quality-assurance mechanisms, the robot controller 110 may allow programs to be executed in a dedicated mode (e.g., manual mode, trial mode, guided mode), in which the policy is barred from being applied and therefore is unable to restrict execution.

The determining step 216 may include computing a fingerprint of the program and matching it against a set of fingerprints of programs satisfying a maximum permitted incidence of movement instructions relating to non-verified locations. Similar to the collection of verified locations of the robot manipulator 190, the set of fingerprints may be stored in the robot controller's 110 memory 111 separate from the programs P1, P2, P3, or otherwise in the external memory 180.

In a second embodiment, the method 200 includes an additional preceding step of obtaining 214 a collection of verified locations of the robot manipulator 190. In this embodiment, the determining step 216 includes matching the locations, to which the movement instructions relate, against the collection.

The collection of verified locations of the robot manipulator 190 is preferably stored independently of executable programs P1, P2, P3 of the type that the method 200 assesses. Accordingly, the collection may be stored in the external memory 180 or in the memory 111 but in a file or data structure that is separate from a file containing a particular program. This facilitates reuse of the collection when a further program is to be assessed. Further, the collection can be modified or replaced simply by accessing a single memory location, without a need to revisit each program.

In a third embodiment, the method 200 includes—in addition to said determining 216 and applying 224 a policy—a step of verifying 212 a location by monitored execution of a movement instruction relating to that location. Monitored execution in this sense may include execution at reduced speed and/or execution supervised by an operator and/or execution supervised by robot-external sensorics. The monitored execution may be performed in a manual or automatic mode of the robot. Whether performed in manual or automatic mode, the monitored execution may include operator supervision, automatic supervision or a combination of these. Automatic supervision relies on being adequately informed about the possible error states, i.e., it relies on the foresight of the designer of the corresponding routine or on suitable training given to a machine-learning algorithm; it is however very persistent and accurate in its search for known errors. Conversely, a human observer, when working for limited periods of time, is good at discovering errors that are difficult to foresee on a theoretical or offline basis.

External sensorics may be used to monitor the robot manipulator 190, in particular its position and pose, with an improved accuracy compared to the internal sensors. This is illustrated by the sensor 192 which is shown temporarily mounted in the vicinity of the robot manipulator 190 but is not a component of the robot manipulator 190. The sensor 192 may be an ultrasound sensor, a laser sensor, a camera etc. It may include logic to detect collisions or near-collisions. The execution at reduced speed may help the robot-internal sensors achieve a better delivered accuracy than their intrinsic accuracy, as the reduced speed makes more time available for sampling.

External sensorics shall include the case where objects in the vicinity of the robot manipulator 190 have been previously positioned by a temporary use of external sensors. The positioning achieves that the positions of the surrounding objects are known, after which the external sensors can be removed. This, in turn, allows the robot manipulator 190 to be positioned accurately during the monitored execution, e.g., by letting the arm 191 touch or approach the surrounding objects as needed. The positions of the surrounding objects can be expressed with reference to a robot-internal reference frame or in a non-moving or global reference frame.

As described in a foregoing section, a successful verification of a location may be recorded by entering the location in a collection of verified locations. It is recalled that a location may be a point, a pose (orientation), a path and/or a modulated path. The verified location may be entered in the collection by, e.g., adding a representation of the location to a data record maintained for this purpose.

When the collection is being built during the verification 212, it is generally advantageous to retain key properties of the robot installation which executed the movement instructions. This allows the collection of verified instructions to be reused for as long as the robot installation has not changed. Conversely, it provides a safeguard against improperly applying the collection in order to assess a program which is to execute on a different robot installation. As mentioned, key properties of a robot installation may be one or more of: an identity of the robot, a point of attachment (e.g., a mounting site with specific coordinates or another identifier), a mass of a load carried by the robot, a reference frame, a date of latest calibration, a provisioning date of a robot part, of the robot manipulator or of robot software.

Optionally, the verifying step 212 is preceded by a step of validating 210 a location by simulating a movement instruction relating to the location, and the verifying 212 is restricted to locations that have been validated. As explained above, the validation process may include a computer-aided simulation process, in which a movement instruction relating to the location to be validated is performed in a virtual environment including the robot manipulator 190. The simulation results may be inspected by a human user or may be analyzed automatically or semi-automatically by a computer-implemented routine to establish that there are no undesired outcomes. The location is then deemed to be validated and is made available for verification 212.

In a fourth embodiment, the method 200 comprises a further step of displaying 218 a visualization of any non-verified locations and/or movement instructions relating to non-verified locations. The visualization informs a programmer, operator or other user that locations exists which need to be verified (or overridden) and may indicate exactly which locations or movement instructions are the problematic ones in this sense. The visualization may be displayed on a text or graphical user interface on the robot manipulator 190, on the robot controller 110, or in a programming station or other device suitable for viewing a program.

When this fourth embodiment of the method 200 includes matching against a collection of verified locations, it optionally comprises a further step of determining 220 whether the collection has been modified or replaced. If this is found to be the case (downward branch), the visualization is updated 222 in accordance with the modified or replaced collection. The updated visualization may reveal that some locations have become obsolete as a result of the change of the collection. Conversely, if it is determined that the collection remains unchanged (right-hand branch), the determination 220 is repeated after a predefined amount of time. The determination 220 may furthermore be repeated in a similar fashion after the visualization has been updated 222.

In a fifth embodiment, the method 200 comprises a step of obtaining 215 identification information related to a robot installation, determining 216, on the basis of the identification information, whether any of the movement instructions relates to a location of the robot manipulator which is non-verified with respect to the robot installation, and, if at least one non-verified location is found, applying 224 a policy which restricts execution of the program. The identification information related to a robot installation may be obtained from operator input or by issuing a request (e.g., to the robot controller 110) for self-identification of the robot installation to which the robot manipulator 190 belongs.

It is understood that the identification information allows the entity executing the method 200 to identify the robot installation which applies to the robot manipulator 190. This enables reuse of existing knowledge. For example, the method 200 may include a preceding step 214 of obtaining a collection of verified locations of the robot manipulator 190, wherein the collection is associated with at least one robot installation. The collection is associated with at least one robot installation because, on the one hand, it may be applicable to multiple robot installations. On the other hand, the collection may include a first sub-collection of locations which are verified for a first robot installation (or group of robot installations), as well as a second sub-collection of locations which are verified for a second robot installation. In the determining step 216, the locations, to which the movement instructions of the program P1, P2, P3 relate, are matched only against the sub-collection corresponding to the robot installation of the robot manipulator 190. Indeed, even if a specific location has been verified previously for a different robot installation (e.g., at a different point of attachment), there remains the possibility that the robot installation of the present robot manipulator 190 has a more restricted free space, with an increased collision risk.

The steps of the second, third, fourth and fifth embodiments may be combined to form still further embodiments. The fingerprint-based indirect determination 216 of non-verified locations may be an optional feature of each such combination. For example, a combination of the second and third embodiments may provide a method 200 that creates and applies the collection of verified locations of the robot manipulator 190.

The aspects of the present invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a robot manipulator on the basis of a program containing a plurality of movement instructions, the method comprising:
   obtaining identification information related to a robot installation;
   determining, on the basis of the identification information, whether any of the movement instructions relates to a location of the robot manipulator which is nonverified with respect to the robot installation, wherein the location is a pose, a path and/or a modulated path; and
   applying, in response to a positive determination, a policy which restricts execution of the program:
   wherein said determining step includes:
      comparing locations to which the movement instructions relate against a collection of verified locations of the robot manipulator, and
      finding the non-verified location by attempting to match the locations against the collection of verified locations.

2. The method of claim 1, further comprising:
   obtaining the collection of verified locations of the robot manipulator, which is associated with the robot installation, wherein said determining includes matching the locations, to which the movement instructions relate, against the collection.

3. The method of claim 1, further comprising initially:
   verifying a location by monitored execution, using the robot installation, of a movement instruction relating to the location.

4. The method of claim 3, wherein the monitored execution comprises at least one of: execution at reduced speed, execution supervised by an operator, execution supervised by robot-external sensorics.

5. The method of claim 3, wherein said verifying is restricted to validated locations, the method further comprising:
   validating a location by simulating a movement instruction relating to the location.

6. The method of claim 3, further comprising adding the verified location to the collection of verified locations associated with the robot installation used for said verifying.

7. The method of claim 2, wherein the collection of verified locations is stored independently of the program.

8. The method of claim 1, wherein the robot installation, with which the collection of verified locations is associated, is identified by one or more of the following:
   an identity of the robot,
   a point of attachment,
   a load mass,
   a reference frame,
   a date of latest calibration,
   a provisioning date of a robot part, of the robot manipulator or of robot software.

9. The method of claim 1, further comprising:
   displaying a visualization of the non-verified location and/or said any of the movement instructions relating to the non-verified location.

10. The method of claim 9,
    wherein said method further comprises updating the visualization in response to a change in or replacement of the collection.

11. The method of claim 1, wherein said determining includes computing a fingerprint of the program and matching it against a set of fingerprints of programs satisfying a maximum permitted incidence of movement instructions relating to non-verified locations.

12. The method of claim 11, wherein the set of fingerprints is associated with the robot installation.

13. The method of claim 11, wherein the fingerprint is computed using a function configured to:
- disregard code which a compiler or interpreter or execution environment ignores, and/or
- disregard user-oriented comments and names.

14. A processor, such as a robot controller, comprising memory and processing circuitry configured to perform steps of a method of controlling a robot manipulator on the basis of a program containing a plurality of movement instructions, including:
- obtaining, identification information related to a robot installation;
- determining, on the basis of the identification information, whether any of the movement instructions relates to a location of the robot manipulator which is nonverified with respect to the robot installation, wherein the location is a pose, a path and/or a modulated path; and
- applying, in response to a positive determination, a policy which restricts execution of the program:

wherein said determining step includes
- comparing locations to which the movement instructions relate, against a collection of verified locations of the robot manipulator, and
- finding the non-verified location by attempting to match the locations against the collection of verified locations.

15. A computer program comprising instructions to cause a programmable processor to execute steps of a method of controlling a robot manipulator on the basis of a program containing a plurality of movement instructions, including:
- obtaining, identification information related to a robot installation;
- determining, on the basis of the identification information, whether any of the movement instructions relates to a location of the robot manipulator which is nonverified with respect to the robot installation, wherein the location is a pose, a path and/or a modulated path; and
- applying, in response to a positive determination, a policy which restricts execution of the program, wherein said determining step includes:
- comparing locations to which the movement instructions relate, against a collection of verified locations of the robot manipulator, and
- finding the non-verified location by attempting to match the locations against the collection of verified locations.

16. The processor of claim 14, wherein the processing circuitry is configured to perform:
- obtaining the collection of verified locations of the robot manipulator, which is associated with the robot installation, wherein said determining includes matching the locations, to which the movement instructions relate, against the collection.

17. The processor of claim 14, wherein the processing circuitry is configured to perform initially:
- verifying a location by monitored execution, using the robot installation, of a movement instruction relating to the location.

18. The processor of claim 17, wherein the monitored execution comprises at least one of: execution at reduced speed, execution supervised by an operator, execution supervised by robot-external sensorics.

19. The processor of claim 14, wherein the robot installation, with which the collection of verified locations is associated, is identified by one or more of the following:
- an identity of the robot,
- a point of attachment,
- a load mass,
- a reference frame,
- a date of latest calibration,
- a provisioning date of a robot part, of the robot manipulator or of robot software.

20. The processor of claim 14, wherein the processing circuitry is configured to perform:
- displaying a visualization of the non-verified location and/or said any of the movement instructions relating to the non-verified location.

* * * * *